US012700725B2

(12) United States Patent
Döbler et al.

(10) Patent No.: US 12,700,725 B2
(45) Date of Patent: Aug. 4, 2026

(54) CIRCUIT BREAKER DEVICE AND METHOD OF TRIGGERING THE CIRCUIT BREAKER DEVICE IF CURRENT AND VOLTAGE THRESHOLD VALUES ARE EXCEEDED IN A TIME WINDOW

(71) Applicant: Siemens Aktiengesellschaft, Munich (DE)

(72) Inventors: Fabian Döbler, Theilenhofen (DE); Christopher Fromme, Fürth (DE); Dominic Malane, Eichstätt (DE); Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 515 days.

(21) Appl. No.: 18/258,595

(22) PCT Filed: Dec. 16, 2021

(86) PCT No.: PCT/EP2021/086160
§ 371 (c)(1),
(2) Date: Jun. 21, 2023

(87) PCT Pub. No.: WO2022/136100
PCT Pub. Date: Jun. 30, 2022

(65) Prior Publication Data
US 2024/0047960 A1     Feb. 8, 2024

(30) Foreign Application Priority Data
Dec. 21, 2020     (DE) ..................... 10 2020 216 397.9

(51) Int. Cl.
*H02H 3/44*         (2006.01)
*H01H 9/54*         (2006.01)
(Continued)

(52) U.S. Cl.
CPC .............. *H02H 3/44* (2013.01); *H01H 9/548* (2013.01); *H02H 3/08* (2013.01); *H02H 3/05* (2013.01)

(58) Field of Classification Search
None
See application file for complete search history.

(56) References Cited

U.S. PATENT DOCUMENTS 3,662,182 A      5/1972  Ullmann et al.
10,254,327 B2    4/2019  Mauder et al.
(Continued)

FOREIGN PATENT DOCUMENTS

CH          497805 A      10/1970
DE    102008052949 A1     4/2010
(Continued)

OTHER PUBLICATIONS

Video: "Motus<IDC14 Launch Event", live online since Nov. 24, 2020, retrieved https://www.motus-c14.de/de/event.
(Continued)

*Primary Examiner* — Bernard Rojas
(74) *Attorney, Agent, or Firm* — Laurence A. Greenberg; Werner H. Stemer; Ralph E. Locher

(57)          ABSTRACT

A circuit breaker device protects an electrical low-voltage current circuit. The level of a current of the low-voltage current circuit is ascertained periodically such that current values are provided incrementally. The level of the voltage of the low-voltage current circuit is ascertained periodically such that voltage values are provided incrementally. The change in the current is ascertained from the periodically ascertained current values over time such that current change values are provided incrementally, and a differential voltage is ascertained from the periodically ascertained voltage values and an expected value of the voltage such that
(Continued)

differential voltage values are provided incrementally. Each current change value is compared with a second threshold, and each differential voltage value is compared with a first threshold. If the first and second thresholds are exceeded, an interruption of the current circuit is initiated by switching elements being set to a high-ohmic state.

19 Claims, 3 Drawing Sheets

(51) Int. Cl.
*H02H 3/05* (2006.01)
*H02H 3/08* (2006.01)

(56) References Cited

U.S. PATENT DOCUMENTS

| | | | |
|---|---|---|---|
| 10,541,530 B2 | 1/2020 | Kennedy et al. | |
| 2001/0036047 A1 | 11/2001 | Macbeth et al. | |
| 2009/0167315 A1 | 7/2009 | Lindsey | |
| 2009/0179631 A1 | 7/2009 | Hu et al. | |
| 2016/0172840 A1 | 6/2016 | Luebke et al. | |
| 2017/0256934 A1 | 9/2017 | Kennedy et al. | |
| 2018/0198271 A1* | 7/2018 | Morimoto | H02H 3/44 |
| 2019/0229529 A1 | 7/2019 | Askan et al. | |
| 2019/0371557 A1 | 12/2019 | Haslinger | |
| 2020/0028345 A1 | 1/2020 | Roy et al. | |
| 2020/0321767 A1 | 10/2020 | Meyer et al. | |
| 2020/0321768 A1 | 10/2020 | Schegner et al. | |
| 2020/0365346 A1 | 11/2020 | Telefus et al. | |
| 2021/0126447 A1* | 4/2021 | Miller | H01H 71/58 |
| 2024/0047957 A1 | 2/2024 | Döbler et al. | |
| 2025/0253645 A1* | 8/2025 | Compton | H02H 9/00 |

FOREIGN PATENT DOCUMENTS

| | | | |
|---|---|---|---|
| DE | 102015016022 A1 | 6/2016 | |
| DE | 102016123955 A1 | 6/2018 | |
| DE | 102018101312 A1 | 7/2019 | |
| DE | 102020216396 B3 | 5/2022 | |
| EP | 1840584 A2 | 10/2007 | |
| EP | 3700038 B1 | 9/2022 | |
| GB | 2531787 A | 5/2016 | |
| WO | 2017207030 A1 | 12/2017 | |
| WO | 2017207031 A9 | 1/2019 | |
| WO | 2020169753 A1 | 8/2020 | |

OTHER PUBLICATIONS

OEZ Modeion: "Moulded case circuit breakers", Catalog 2013, retrieved from http://oezco.ir/wp-content/uploads/2016/11/3%20pdf.pdf, pp. 1-16.

Lindmayer, M. et al:. "Digitale Algorithmen zur frühzeitigen Kurzschlußerkennung", [Digital algorithms for early short-circuit detection], Elektrotechnische Zeitschrift ETZ, Issue: 112/13-14, 1991, pp. 718-722—English abstract.

Customer presentation "Introduction Motus<IDC14", created on Sep. 8, 2020, shown at a customer presentation appointment with the patent owner on Oct. 29, 2020, pp. 1-20.

Transcript of video "Motus<IDC14 Launch Event", 2:47min to 5:21 min—English machine translation.

Koukrossis, D: "Revolutionizing Circuit Protection", Jun. 9, 2020 retrieved from https://compoundsemicond uctor. net/article/111435/Revolution ising_Ci rcu it_Protection/feature.

Mützel, T.: Dissertation "Verfahren zur Kurzschlussfrüherkennung zur Verbesserung der strombegrenzenden Wirkung mechanischer Leistungsschalter im Kurzschlussfall" [Procedure for early short-circuit detection to improve the current-limiting effect of mechanical circuit breakers in the event of a short-circuit], 2008, Technische Universität Ilmenau—English abstract.

Wöhner: Collection of delivery notes for Motus<IDC14 products, all dated to the period between Feb. 12, 2020 and Dec. 16, 2020.

Microchip Technology Inc., Sam D5x/E5x Family Data Sheet, 2020, p. 1-1925, Microchip Technology Inc.

Microchip, Product Change Notification—SYST-04EEXS140, Data Sheet—SAM D5X/E5X Family Datasheet, May 5, 2020, p. 1-2, Microchip.

* cited by examiner

CIRCUIT BREAKER DEVICE AND METHOD OF TRIGGERING THE CIRCUIT BREAKER DEVICE IF CURRENT AND VOLTAGE THRESHOLD VALUES ARE EXCEEDED IN A TIME WINDOW

FIELD AND BACKGROUND OF THE INVENTION

The invention relates to the technical field of a circuit breaker device for a low-voltage circuit, in particular having an electronic interruption unit, according to the preamble of the independent circuit breaker device patent claim and to a method for a circuit breaker device for a low-voltage circuit according to the preamble of the independent method patent claim.

Low voltage means voltages of up to 1000 volts AC or up to 1500 volts DC. Low voltage means in particular voltages that are greater than extra-low voltage, with values of 50 volts AC or 120 volts DC.

Low-voltage circuit or system or installation means circuits having nominal currents or rated currents of up to 125 amps, more specifically up to 63 amps. Low-voltage circuit means in particular circuits having nominal currents or rated currents of up to 40 amps, 32 amps, 25 amps, 16 amps or 10 amps. The stated current values mean in particular nominal, rated and/or interrupting currents, i.e. the maximum current normally carried via the circuit or usually resulting in the electrical circuit being interrupted, for example by a protective device, such as a circuit breaker device, miniature circuit breaker or power breaker.

Miniature circuit breakers are overcurrent protective devices that have been known for a long time and are employed in low-voltage circuits in electrical installation engineering. They protect lines from damage as a result of heating due to excessively high current and/or short circuit. A miniature circuit breaker can automatically break the circuit in the event of overload and/or short circuit. A miniature circuit breaker is a fusing element that does not automatically reset.

Power breakers, in contrast to miniature circuit breakers, are provided for currents greater than 125 A, in some cases even from as little as 63 amps. Miniature circuit breakers are therefore of simpler and more delicate design. Miniature circuit breakers normally have a mounting option for mounting on what is known as a top-hat rail (mounting rail, DIN rail, TH35).

Miniature circuit breakers are of electromechanical design. They have a mechanical switching contact or open-circuit shunt release in a housing in order to interrupt (trip) the electrical current. A bimetallic protective element or bimetallic element is normally used for tripping (interruption) in the event of longer-lasting overcurrent (overcurrent protection) or in the event of thermal overload (overload protection). An electromagnetic trip with a coil is employed for brief tripping when an overcurrent limit value is exceeded or in the event of a short circuit (short circuit protection). One or more arc extinguishing chamber(s) or devices for arc extinction are provided. In addition, connecting elements for conductors of the electrical circuit that is to be protected.

Circuit breaker devices having an electronic interruption unit are relatively novel developments. They have a semiconductor-based electronic interruption unit. That is to say that the flow of electric current in the low-voltage circuit is carried via semiconductor components or semiconductor switches that are able to interrupt the flow of electric current or to be switched on. Circuit breaker devices having an electronic interruption unit frequently have a mechanical isolating contact system, in particular having isolator properties according to relevant standards for low-voltage circuits, the contacts of the mechanical isolating contact system being connected in series with the electronic interruption unit, i.e. the current in the low-voltage circuit to be protected is carried via both the mechanical isolating contact system and the electronic interruption unit.

In the case of semiconductor-based circuit breaker devices or protection equipment, solid-state circuit breakers, SSCB for short, the switching energy does not need to be converted into an arc as in the case of a mechanical switching device, but rather needs to be converted into heat by means of an additional circuit, the energy absorber. The breaking energy comprises the energy stored in the circuit, i.e. in the system, line or load impedances. In order to relieve the load on the energy absorber, the current flowing at the time of breaking needs to be as small as possible. This also applies in the case of a short circuit. Here, the current rises very quickly. Rapid short-circuit detection allows a short circuit to be detected early and an excessively high short-circuit current to be avoided. The semiconductor-based circuit breaker device interrupts the circuit, within the context of a break operation, almost without delay, within µs. No high currents arise and the load on the energy absorber of a semiconductor-based circuit breaker device is reduced. Known short-circuit detection systems or break criteria are normally based on the ascertainment and evaluation of the actual value of the current.

SUMMARY OF THE INVENTION

The object of the present invention is to improve a circuit breaker device of the type mentioned at the outset, in particular to demonstrate a fast and alternative option for short-circuit detection and to ensure reliable interruption.

This object is achieved by a circuit breaker device having the features of the independent circuit breaker device patent claim and by a method according to the independent method patent claim.

According to the invention, there is provision for a circuit breaker device for protecting an electrical low-voltage circuit, comprising:

a housing having connections for conductors of the low-voltage circuit, a current sensor in order to (in particular periodically) ascertain the level of the current of the low-voltage circuit, with the result that current values are available (in particular cyclically), a voltage sensor in order to (in particular periodically) ascertain the level of the voltage of the low-voltage circuit, with the result that voltage values are available (in particular cyclically), an electronic interruption unit that, as a result of semiconductor-based switching elements, has a high-impedance state for the switching elements for the purpose of interruption and a low-impedance state for the switching elements for the purpose of current flow in the low-voltage circuit, a control unit connected to the current sensor, to the voltage sensor and to the interruption unit. According to the invention, the circuit breaker device is configured such:

that the ascertained current values are used to ascertain the change in current over time, with the result that current change values are available cyclically, that the ascertained voltage values and an expected value
(which is variable over time) for the voltage are used to
ascertain a difference voltage, with the result that
difference voltage values are available cyclically,
that each difference voltage value is compared with a first
threshold value,
that each current change value is compared with a second
threshold value,
that interruption of the low-voltage circuit is initiated if
the first and second threshold values are exceeded
within a first time window. Exceeded within a first time
window means in particular that the difference voltage
value and the current change value for the same clock
cycle or for preceding or subsequent or adjacent clock
cycles have been exceeded.

This has the particular advantage that very rapid and
reliable detection of a short circuit is facilitated, since a
current change value and a difference voltage value that
occur close together in time, i.e. within the first time
window, already result in interruption of the electrical low-
voltage circuit.

Advantageous configurations of the invention are speci-
fied in the subclaims.

In one advantageous configuration of the invention, inter-
ruption of the low-voltage circuit is initiated if at least two,
in particular at least three or precisely three, successive
difference voltage values have been exceeded.

This has the particular advantage that, irrespective of
whether the second threshold value (a current change value)
is exceeded, interruption is initiated if at least two (at least
three or precisely three) successive difference voltage values
have been exceeded. There is thus a second criterion that
increases tripping reliability, since an overcurrent or short
circuit is combined with a change in the voltage. Tripping
reliability can thus be ensured or increased even in the event
of failure of a current sensor or an error in the processing of
the current values.

In one advantageous configuration of the invention, inter-
ruption of the low-voltage circuit is initiated if at least two,
in particular precisely two or precisely three or at least three,
successive current change values have been exceeded.

This has the particular advantage that, irrespective of
whether the threshold value of the difference voltage value
is exceeded, interruption is initiated if at least two (precisely
two, precisely three or at least three) successive current
change values exceed the second threshold value. There is
thus a third criterion that increases tripping reliability, since
a short circuit is combined with a change in the current.
Tripping reliability can thus be ensured or increased even in
the event of failure of a voltage sensor or an error in the
processing of the voltage values.

In one advantageous configuration of the invention, the
current change values and difference voltage values, in
particular also the current values or/and voltage values, are
periodically ascertained at a clock frequency that is greater
than/equal to 10 kHz and less than/equal to 10 MHz, more
specifically greater than/equal to 10 kHz and less than/equal
to 1 MHz, in particular around or precisely 50 kHz or around
or precisely 100 kHz.

This has the particular advantage that current values and
voltage values are both available cyclically at intervals of
time of between 100 μs and 0.1 μs, more specifically
between 100 μs and 1 μs. That is to say that very rapid
short-circuit detection in the μs range can take place.

In one advantageous configuration of the invention, the
second threshold value is in the range from 1 to 10 A/μs, in particular in the range from 1 to 5 A/μs, more specifically in
the range from 1 to 2 A/μs, 2 to 3 A/μs or 4 to 5 A/μs.

This has the particular advantage that rapid and reliable
detection of short-circuit events is facilitated.

In one advantageous configuration of the invention, the
first threshold value is in the range from 10 to 100 volts, in
particular in the range from 10 to 50 volts or in the range
from 50 volts to 100 volts.

This has the particular advantage that rapid and reliable
detection of short-circuit events is facilitated. In particular,
particularly sensitive tripping is facilitated for high reliabil-
ity in the range from 10 to 50 volts. In particular, a
particularly robust solution is facilitated, in particular for
industrial applications, in the range from 50 to 100 volts.

In one advantageous configuration of the invention, the
current change values are supplied to a second comparator
in order to compare each current change value with the
second threshold value, the difference voltage values are
supplied to a first comparator in order to compare each
difference voltage value with the first threshold value, the
outputs of the comparators are combined by way of a first
AND gate, with the result that interruption of the low-
voltage circuit is initiated if the first and second threshold
values are exceeded.

This has the particular advantage that there is a simple
structure for implementing the invention.

In one advantageous configuration of the invention, the
output of the first comparator is further connected to a
second AND gate:

firstly directly, secondly via a first buffer store, which buffer-stores
precisely one comparator output value, alternatively thirdly via the first buffer store with a second
buffer store, which buffer-stores precisely one com-
parator output value, alternatively via further buffer stores, with the result that
interruption of the low-voltage circuit is initiated if at
least two (precisely two, alternatively precisely three or
alternatively at least three) successive difference volt-
age values have been exceeded.

This has the particular advantage that there is a simple
structure for implementing the voltage monitoring of the
invention.

In one advantageous configuration of the invention, the
output of the second comparator is further connected to a
third AND gate firstly directly and secondly via a third buffer
store, which buffer-stores precisely one comparator output
value, alternatively via further buffer stores connected in
series, with the result that interruption of the low-voltage
circuit is initiated if at least two (precisely two, alternatively
precisely three or at least three) successive current change
values have been exceeded.

This has the particular advantage that there is a simple
structure for implementing the current monitoring of the
invention.

In one advantageous configuration of the invention, the
outputs of the first, second and third AND gates are com-
bined by way of an OR gate, with the result that interruption
of the low-voltage circuit is initiated if the first and second threshold values are exceeded
within the first time window or if at least two (three or more) successive difference
voltage values have been exceeded or if at least two (three or more) successive current change
values have been exceeded.

This has the particular advantage that there is a simple structure for implementing a redundant monitoring circuit of the invention.

Corresponding methods for a circuit breaker device for a low-voltage circuit having electronic (semiconductor-based) switching elements with the same and further advantages are claimed according to the invention.

All configurations, both in dependent form, referring back to the independent claims, and referring back only to individual features or combinations of features of patent claims, result in an improvement in a circuit breaker device for rapidly and reliably breaking in the event of overcurrents and short circuits.

The properties, features and advantages of this invention that are described and the way in which they are achieved will become clearer and more distinctly comprehensible in conjunction with the description of the exemplary embodiments that follows, said exemplary embodiments being explained more thoroughly in conjunction with the drawing, in which:

DETAILED DESCRIPTION OF THE INVENTION

Figure 1:
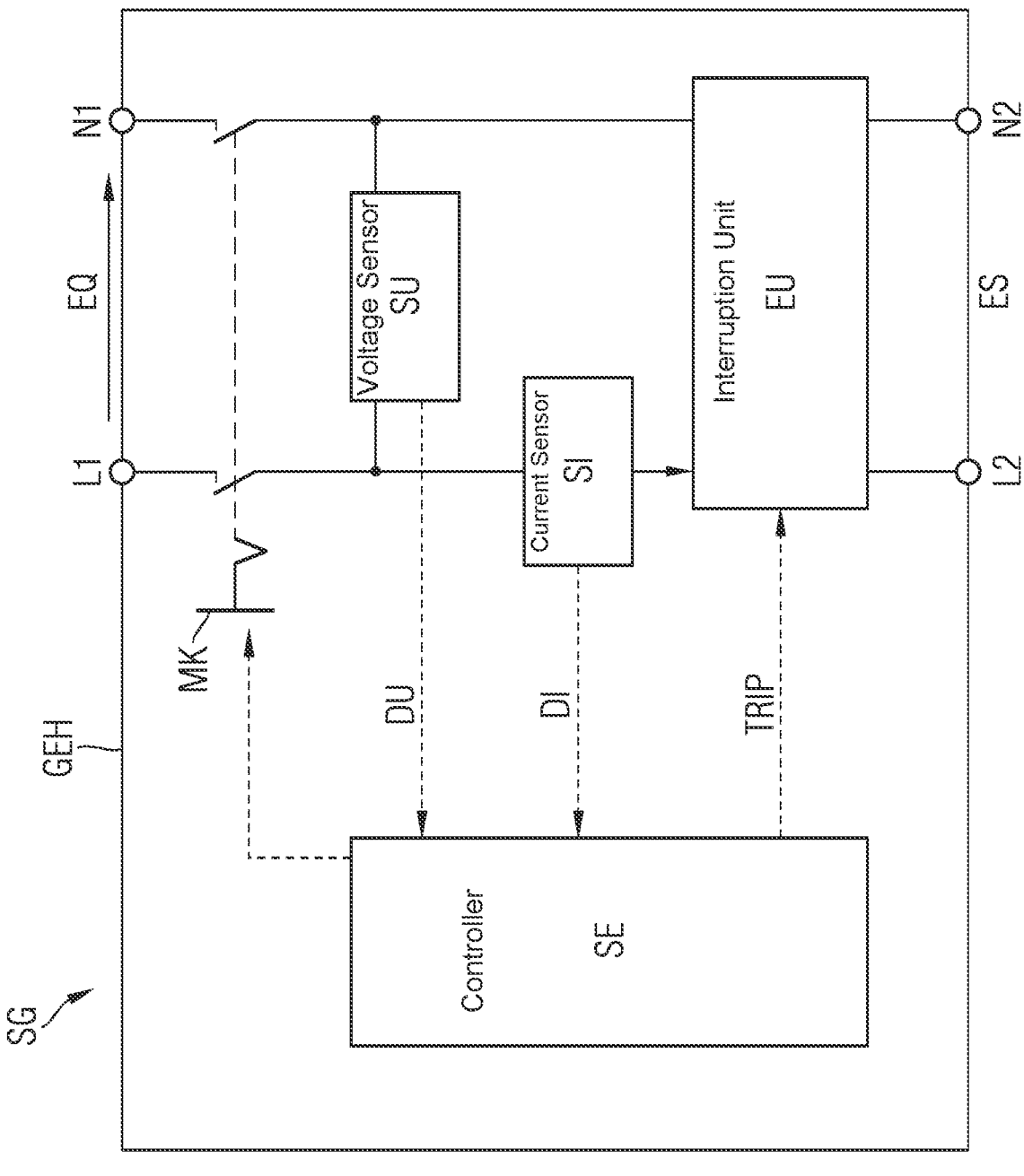
FIG. 1 shows a representation of a circuit breaker device.

FIG. 1 shows a representation of a circuit breaker device SG for protecting an electrical low-voltage circuit having a housing GEH, comprising:

connections for conductors of the low-voltage circuit, in particular first connections L1, N1 for a system-side, in particular energy-source-side, connection EQ of the circuit breaker device SG and second connections L2, N2 for a load-side, in particular energy-sink-side—in the case of passive loads—, connection ES (load-side connection) of the circuit breaker device SG, there being able to be provision for specifically phase-conductor-side connections L1, L2 and neutral-conductor-side connections N1, N2;

the load-side connection can comprise a passive load or/and an active load ((further) energy source), or a load that can be both passive and active, e.g. sequentially in time;

a current sensor SI in order to (in particular periodically) ascertain the level of the current of the low-voltage circuit, with the result that current values are available (in particular cyclically), a voltage sensor SU in order to (in particular periodically) ascertain the level of the voltage of the low-voltage circuit, with the result that voltage values are available (in particular cyclically), an electronic interruption unit EU that, as a result of semiconductor-based switching elements, has a high-impedance state for the switching elements for the purpose of interruption and a low-impedance state for the switching elements for the purpose of current flow in the low-voltage circuit, a control unit SE connected to the current sensor, to the voltage sensor and to the interruption unit.

The circuit breaker device is configured such that the (periodically) ascertained current values are used to ascertain the change in current over time, with the result that current change values DI are available cyclically. That is to say that, in principle, the current change value can be ascertained either in analog form or in digital form. This can be done in the current sensor SI itself or in the control unit SE, for example.

Furthermore, the circuit breaker device is configured such that the (periodically) ascertained voltage values and an expected value (which varies over time) for the voltage are used to ascertain a difference voltage, with the result that difference voltage values DU are available cyclically. That is to say that, in principle, the difference voltage value DU can be ascertained either in analog form or in digital form. This can be done in the voltage sensor SU itself or in the control unit SE, for example.

Each cyclically ascertained difference voltage value DU is compared with a first threshold value. Each cyclically ascertained current change value DI is compared with a second threshold value. The two comparisons can be performed in the control unit SE, for example. Interruption of the low-voltage circuit is initiated if the first and second threshold values are exceeded within a first time window. The interruption is carried out by the electronic interruption unit EU. This electronic interruption unit EU can comprise semiconductor components such as bipolar transistors, field-effect transistors, isolated gate bipolar transistors (IGBTs), metal oxide layer field-effect transistors (MOSFETs) or other (self-commutated) power semiconductors. In particular IGBTs and MOSFETs are particularly suitable for the circuit breaker device according to the invention owing to low flow resistances, high junction resistances and good switching behavior.

The electronic interruption unit EU is shown as a block in the two conductors in FIG. 1. In a first variant, this means no interruption of the two conductors. At least one conductor, in particular the active conductor or phase conductor, has semiconductor-based switching elements. The neutral conductor can be free of switching elements, i.e. without semiconductor-based switching elements. That is to say that the neutral conductor is connected directly, i.e. does not acquire high impedance.

If there is provision for further active conductors/phase conductors, then, in a second variant of the electronic interruption unit EU, the phase conductors have semiconductor-based switching elements. The neutral conductor is connected directly, i.e. does not acquire high impedance. By way of example, for a three-phase AC circuit.

In a third variant of the electronic interruption unit EU, the neutral conductor can likewise have a semiconductor-based switching element, i.e. interruption by the electronic interruption unit EU results in both conductors acquiring high impedance.

The circuit breaker device SG can preferably also comprise a mechanical isolating contact system MK, in particular according to the standard with standard-compliant isolator properties, for electrical isolation of the circuit, in particular for standard-compliant isolation (as opposed to breaking) of the circuit. The mechanical isolating contact system may be connected to the control unit SE, as shown in FIG. 1, with the result that the control unit SE can initiate electrical isolation of the circuit. Specifically, further evaluation may be implemented that brings about electrical isolation if other criteria are satisfied. By way of example, there may be provision for overcurrent detection, for example in the control unit SE, that carries out semiconductor-based or/and electrical interruption of the circuit in the event of overcurrents, i.e. when current-time limit values are exceeded, i.e. when a current that exceeds a current limit value is present for a specific time, i.e. for example a specific energy threshold value is exceeded. Alternatively or additionally, a short circuit can also result in electrical isolation being initiated, for example.

In a further advantageous configuration, electrical isolation can be initiated if the electronic interruption unit EU is at high impedance and there is a current in the low-voltage circuit, detected in particular by the current sensor SI, that exceeds a third threshold value. Depending on the field of use of the circuit breaker device, the third threshold value can be in the order of magnitude of from 4 to 6 mA, in particular can be 5 mA or 6 mA. The third threshold value can be in the range from 26 mA to 30 mA, in particular can be 28 mA, 29 mA or 30 mA, in particular for personnel protection in Europe. The third threshold value can be in the range from 290 mA to 300 mA, each of the marginal and intermediate values being disclosed, in particular for fire safety.

In a first variant, the mechanical isolating contact system MK can interrupt on a single-pole basis. That is to say that only one conductor of the two conductors, in particular the active conductor or phase conductor, is interrupted, i.e. has a mechanical contact. The neutral conductor is then free of contacts, i.e. the neutral conductor is connected directly.

If there is provision for further active conductors/phase conductors, then, in a second variant, the phase conductors have mechanical contacts of the mechanical isolating contact system. In this second variant, the neutral conductor is connected directly. By way of example, for a three-phase AC circuit.

In a third variant of the mechanical isolating contact system MK, the neutral conductor likewise has mechanical contacts, as shown in FIG. 1.

Mechanical isolating contact system MK means in particular a (standard-compliant) isolating function, provided by the isolating contact system MK. Isolating function means the points:

minimum air gap according to the standard (minimum distance between the contacts), contact position indication for the contacts of the mechanical isolating contact system, operation of the mechanical isolating contact system always possible (no locking of the isolating contact system).

With regard to the minimum air gap between the contacts of the isolating contact system, this is substantially voltage-dependent. Other parameters are the degree of soiling, the type of field (homogeneous, inhomogeneous) and the air pressure or the height above sea level.

There are appropriate regulations or standards for these minimum air gaps or creepage distances. In air, for example, these regulations indicate the minimum air gap for a surge withstand capability for an inhomogeneous and a homogeneous (ideal) electrical field on the basis of the degree of soiling. The surge withstand capability is the strength when an applicable surge voltage is applied. Only if this minimum length (minimum distance) exists does the isolating contact system or circuit breaker device have an isolating function (isolator property).

Within the context of the invention, the series of standards DIN EN 60947, or IEC 60947, which are mentioned here by way of reference, is relevant to the isolator function and the properties thereof in this instance.

The isolating contact system is advantageously characterized by a minimum air gap between the open isolating contacts in the OFF position (open position, open contacts) on the basis of the rated surge withstand capability and the degree of soiling. The minimum air gap is in particular between (a minimum of) 0.01 mm and 14 mm. In particular, the minimum air gap is advantageously between 0.01 mm at 0.33 kV and 14 mm at 12 kV, in particular for degree of soiling 1 and in particular for inhomogeneous fields.

The minimum air gap can advantageously have the following values:
1 E DIN EN 60947-1 (VDE 0660-100):2018-06

TABLE 13 minimum air gaps

| Rated surge withstand capability $U_{imp}$ | Minimum air gaps mm | | | | | | | |
| | Case A Inhomogeneous field (see 3.7.63) Degree of soiling | | | | Case B homogeneous field, ideal conditions (see 3.7.62) Degree of soiling | | | |
| kV | 1 | 2 | 3 | 4 | 1 | 2 | 3 | 4 |
| 0.33 | 0.01 | | | | 0.01 | | | |
| 0.5 | 0.04 | 0.2 | | | 0.04 | 0.2 | | |
| 0.8 | 0.1 | | 0.8 | | 0.1 | | 0.8 | 1.6 |
| 1.5 | 0.5 | 0.5 | | 1.6 | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The smallest air gaps indicated are based on the 1.2/50-μs surge voltage at an air pressure of 80 kPa, corresponding to the air pressure at 2000 m above sea level.

The degrees of soiling and types of field are consistent with those defined in the standards. This advantageously allows a standard-compliant circuit breaker device dimensioned according to the rated surge withstand capability to be achieved.

Figure 2:
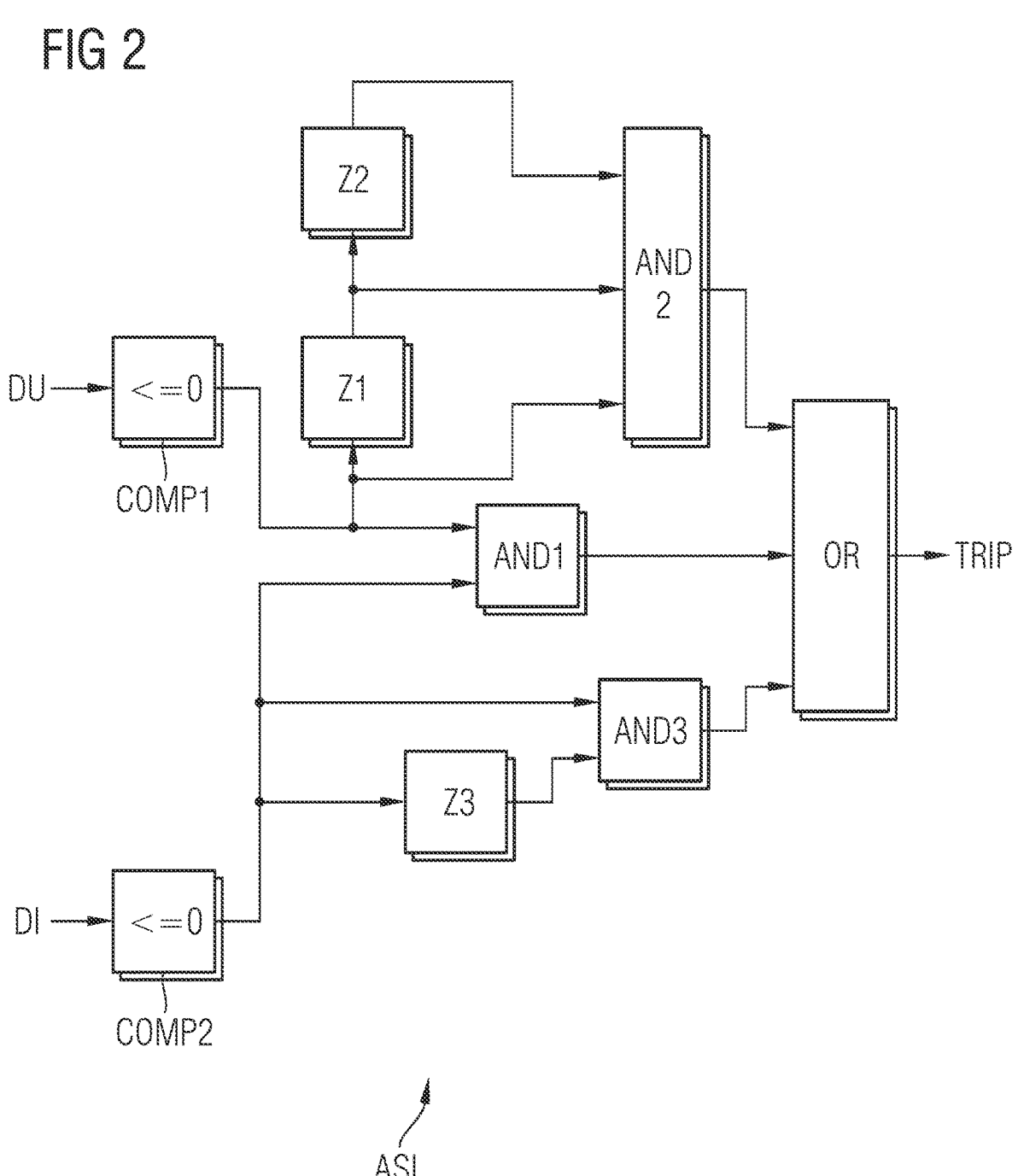
FIG. 2 shows a representation of break logic.

FIG. 2 shows a representation of break logic ASL, as may be implemented for example in the control unit SE shown in FIG. 1, for example in terms of function or circuitry. The difference voltage values DU are supplied (cyclically) to a first comparator COMP1 in order to compare each difference voltage value DU with the first threshold value. The current change values DI are supplied (cyclically) to a second comparator COMP2 in order to compare each current change value DI with the second threshold value. The outputs of the comparators COMP1, COMP2 are logically combined by way of a first AND gate AND1, with the result that interruption of the low-voltage circuit is initiated, for example by an interrupt signal TRIP transmitted from the control unit SE to the electronic interruption unit EU, in the event of the first and second threshold values, ideally for the same clock cycle or for the preceding/subsequent or adjacent clock cycle, being exceeded.

FIG. 2 additionally shows a configuration in which the output of the first comparator COMP1 is further connected to a second AND gate AND2:

firstly directly, secondly via a first buffer store Z1, which (cyclically) buffer-stores precisely one comparator output value, thirdly via the first buffer store Z1 with a second buffer store Z2, which (cyclically) buffer-stores precisely one comparator output value, with the result that interruption of the low-voltage circuit is initiated, for example by the interrupt signal TRIP transmitted from the control unit SE to the electronic interruption unit EU, if three successive difference voltage values DU have been exceeded.

In general, there may be provision for only the first buffer store Z1 (two difference voltage values DU have been exceeded), or there may analogously be provision for further buffer stores (four, five, . . . difference voltage values DU have been exceeded).

FIG. 2 additionally shows a configuration in which the output of the second comparator COMP2 is further connected to a third AND gate AND3 firstly directly and secondly via a third buffer store Z3, which (cyclically) buffer-stores precisely one comparator output value, with the result that interruption of the low-voltage circuit is initiated, for example by the interrupt signal TRIP transmitted from the control unit SE to the electronic interruption unit EU, if two successive current change values have been exceeded.

In general, there may be provision for further buffer stores (three, four, five, . . . current change values have been exceeded).

FIG. 2 additionally shows a configuration in which the outputs of the first, second and third AND gates AND1, AND2, AND3 are combined by way of an OR gate OR, with the result that interruption of the low-voltage circuit is initiated, for example by the interrupt signal TRIP, which is delivered by the OR gate OR in this case, if the first and second threshold values are exceeded within the first time window or if at least two (in the example in particular three) successive difference voltage values DU have been exceeded or if at least two (in the example precisely two) successive current change values have been exceeded.

The current change values DI and difference voltage values DU, or the current values and voltage values, are periodically ascertained, for example in the current sensor SI or voltage sensor SU, or in the control unit SE, at a clock frequency that is greater than/equal to 10 kHz and less than/equal to 10 MHz, more specifically greater than/equal to 10 kHz and less than/equal to 1 MHz, every intermediate value being disclosed or/and included. As such, current values and voltage values are both available cyclically at intervals of time of between 100 μs and 0.1 μs, more specifically between 100 μs and 1 μs. As such, the current change value DI and the difference voltage value DU for the same clock cycle, if identically clocked values are available, can be compared with the threshold values. Alternatively, the current change value and the difference voltage value for temporally corresponding clock cycles, if there is an interval of time, clock difference, between voltage values and current values/current change value and difference voltage value.

The interval of time should not be greater than one clock cycle of the sampling. That is to say that, depending on the sampling rate, the first time window is precisely one clock cycle of the sampling rate long. That is to say that e.g. at a sampling rate of 100 kHz the clock cycle is 10 μs, i.e. the interval between two samples is 10 μs, i.e. the first time window is then no more than 10 μs.

The invention will be explained once again below using different words. Known short-circuit detection systems are based on the sole ascertainment of the actual value of the current. According to the invention, a circuit breaker device SG should incorporate not only current measurement but also voltage measurement, for example in the form of current sensors SI and voltage sensors SU. The current sensors SI and voltage sensors SU are preferably meant to have a bandwidth that is greater than the clock frequency. The current sensors SI and voltage sensors SU are used for early short-circuit detection. The current sensor SI can have a measuring resistor or shunt, for example.

A load on the load-side side of the circuit breaker device SG is bypassed by a very small resistance in the event of a short circuit. The measured voltage across the circuit breaker device dips sharply when a short circuit occurs on the (energy-sink-side) load side. According to the invention, it has been found that evaluation and combination of the derivative of the current and calculation of a difference for the voltage (voltage value to expected voltage value (expected value of the voltage)) allow rapid early short-circuit detection.

The expected value of the voltage can be ascertained for example by what is known as a phase locked loop, PLL for short. A PLL is an electronic circuit arrangement that influences the phase and, in association therewith, the frequency of a variable oscillator by way of a closed control loop in such a way that the phase error between an external periodic reference signal and the oscillator or a signal derived therefrom is as constant as possible.

It is thus possible to ascertain, among other things, the fundamental frequency and the amplitude thereof for the supplied system voltage, i.e. the expected value of the (system) voltage.

The expected value delivered by the PLL for the voltage can then be compared with the ascertained voltage value, in particular in a time- or phase-synchronous manner, with the result that a difference between the values is available. Often, a PLL itself can perform such a function, i.e. deliver the difference, i.e. a difference voltage value DU.

The measured value processing and the break logic may be implemented e.g.: in the control unit SE, both in analog technology, in a computer, such as a microcontroller (μC) or a field programmable gate array (FPGA), or in some cases in analog technology and in some cases in a computer or digital technology.

The cyclic voltage and current values/current change values DI and difference voltage values DU are compared with threshold values (limits), e.g. using comparators. Logic combinations between the comparison results (comparator output) allow different break conditions to be implemented, see FIG. 2 by way of illustration.

Figure 3:
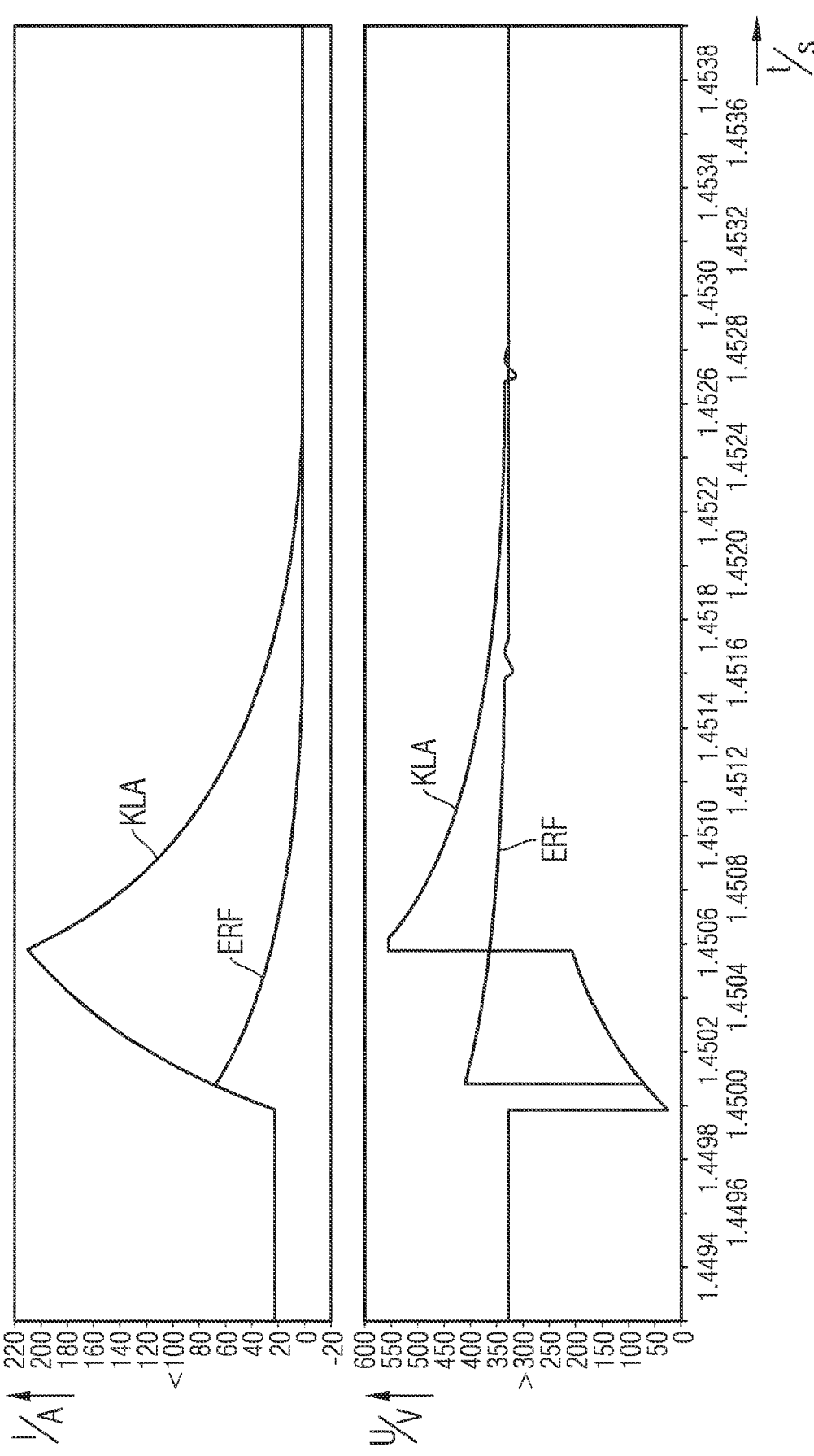
FIG. 3 shows a current characteristic and a voltage characteristic as a function of time.

FIG. 3 shows characteristics for current I in amps A (top) and voltage U in volts V (bottom)—on the vertical y axis—over time t in seconds s—on the horizontal x axis. It shows the simulated comparison of the time characteristic ERF of the present invention compared with the time characteristic KLA of simple (conventional) overcurrent breaking. A short circuit occurs at t=145 ms. The current I rises with a steep gradient and at the same time the measured voltage U dips abruptly.

The time characteristic KLA of the simple overcurrent breaking, which interrupts the flow of current if 200 A are exceeded. Latencies and break times mean that the current continues to rise for a short time after the limit value has been exceeded, however.

The time characteristic ERF of the overcurrent detection according to the invention is based on detection of the high current change value (di/dt) and the sharp dip in the measured voltage, i.e. the difference voltage value DU, and breaks within 10 μs. The invention operates at a sampling rate of 10 μs in this example. Thus, the minimum attainable break times for this case are also defined, and shown in FIG. 3. At shorter sampling rates (higher clock frequencies), shorter break times can be implemented.

The cyclic difference voltage values (voltage change values) and current change values are compared with the threshold values by means of comparators. The outputs of the comparators are combined by way of various logic gates and buffer stores (delay elements). This implements different break conditions, which take account not only of the instantaneous actual value of the difference voltage value and the current change value but also of the history of the actual value of the difference voltage value and the current change value. FIG. 2 shows the illustrative break logic with 3 different trip conditions:

if the difference voltage value DU exceeds the first threshold value (first limit value) in two or more (in the example 3) successive clock cycles, a short circuit is detected, if the difference voltage value DU and the current change value DI exceed the first and second threshold values (respective limit values) at the same time, a short circuit is detected, if the current change value DI exceeds the second threshold value (second limit value) in 2 or more (in the example 2) successive clock cycles, a short circuit is detected.

The invention has the advantage that the influence of the system impedance is reduced during the evaluation of the. The use of present and preceding ("old") measured values improves the performance of the detection, and instances of false tripping are reduced. The invention allows robust and reliable detection of short circuits.

Although the invention has been illustrated and described more thoroughly in detail by way of the exemplary embodiment, the invention is not restricted by the examples disclosed, and other variations can be derived therefrom by a person skilled in the art without departing from the scope of protection of the invention.

The invention claimed is:

1. A circuit breaker for protecting an electrical low-voltage circuit having conductors, comprising:
   a housing having connections for the conductors of the electrical low-voltage circuit;
   a current sensor to ascertain a level of a current of the electrical low-voltage circuit, with a result that current values are available;
   a voltage sensor to ascertain a level of a voltage of the electrical low-voltage circuit, with a result that voltage values are available;
   an electronic interruption unit having semiconductor-based switching elements and, as a result of said semiconductor-based switching elements, said electronic interruption unit has a high-impedance state for said semiconductor-based switching elements for a purpose of interruption and a low-impedance state for said semiconductor-based switching elements for a purpose of current flow in the electrical low-voltage circuit;
   a controller connected to said current sensor, to said voltage sensor and to said electronic interruption unit;
   the circuit breaker is configured such that the current values are used to ascertain a change in current over time, with a result:
      that current change values are available cyclically;
      that the voltage values and an expected value for the voltage are used to ascertain a difference voltage, with a result that difference voltage values are available cyclically;
      that each of the difference voltage values is compared with a first threshold value;
      that each of the current change values is compared with a second threshold value; and that the interruption of the electrical low-voltage circuit is initiated if the first and second threshold values are exceeded within a first time window.

2. The circuit breaker according to claim 1, further comprising a mechanical isolating contact system connected in series with said electronic interruption unit, with a result that electrical isolation can be engaged in the electric low-voltage circuit, wherein said mechanical isolating contact system is connected to said controller.

3. The circuit breaker according to claim 2, wherein the electrical isolation is further initiated if the first and second threshold values are exceeded within the first time window.

4. The circuit breaker according to claim 2, wherein the electrical isolation is initiated if said electronic interruption unit is at high impedance and there is a current in the electrical low-voltage circuit that exceeds a third threshold value.

5. The circuit breaker according to claim 4, wherein the third threshold value is greater than 5 mA.

6. The circuit breaker according to claim 1, wherein the interruption of the electrical low-voltage circuit is initiated if at least two successive said difference voltage values have been exceeded.

7. The circuit breaker according to claim 1, wherein the interruption of the electrical low-voltage circuit is initiated if at least two successive said current change values have been exceeded.

8. The circuit breaker according to claim 1, wherein the current change values and the difference voltage values are available at a clock frequency that is greater than/equal to 10 KHz and less than/equal to 10 MHz.

9. The circuit breaker according to claim 1, wherein the second threshold value is in a range from 1 to 10 A/µs.

10. The circuit breaker according to claim 1, wherein the first threshold value is in a range from 10 to 100 V.

11. The circuit breaker according to claim 1, further comprising:
   a first comparator having an output, wherein the difference voltage values are supplied to said first comparator to compare each of the difference voltage values with the first threshold value;
   a second comparator having an output, the current change values being supplied to said second comparator to compare each of the current change values with the second threshold value; and
   a first AND gate having an output, wherein said output of each of said first and second comparators are combined by way of said first AND gate, with a result that the interruption of the electrical low-voltage circuit is initiated if the first and second threshold values are exceeded.

12. The circuit breaker according to claim 11, further comprising:
   a first buffer store;
   a second buffer store;
   a second AND gate having an output, said output of said first comparator is further connected to said second AND gate:
      firstly directly;
      secondly via said first buffer store, which buffer-stores precisely one comparator output value;
      thirdly via said first buffer store in series with said second buffer store, which buffer-stores precisely one comparator output value, with a result that the interruption of the electrical low-voltage circuit is initiated if at least two said successive difference voltage values have been exceeded.

13. The circuit breaker according to claim 12, further comprising:

a third buffer store; and a third AND gate having an output, wherein said output of said second comparator is further connected to said third AND gate firstly directly and secondly via said third buffer store, which buffer-stores precisely one comparator output value, with a result that the interruption of the electrical low-voltage circuit is initiated if at least two successive said current change values are exceeded.

14. The circuit breaker according to claim 13, further comprising an OR gate, wherein said outputs of said first, second and third AND gates are combined by way of said OR gate, with a result that the interruption of the electrical low-voltage circuit is initiated:

if the first and second threshold values are exceeded within the first time window; or if at least two successive said difference voltage values are exceeded; or if at least two successive said current change values are exceeded.

15. A method for protecting an electrical low-voltage circuit, which comprises the steps of:

ascertaining a level of a current of the electrical low-voltage circuit, with a result that current values are available;

ascertaining a level of a voltage of the electrical low-voltage circuit, with a result that voltage values are available;

using the current values to ascertain a change in current over time, with a result that current change values are available cyclically;

using the voltage values and an expected value for the voltage to ascertain a difference voltage, with a result that difference voltage values are available cyclically;

comparing each of the current change values with a second threshold value;

comparing each of the difference voltage values with a first threshold value; and initiating an interruption of the electrical low-voltage circuit by semiconductor-based switching elements, which are put into a high-impedance state, if the first and second threshold values are exceeded within a first time window.

16. The method according to claim 15, which further comprises initiating the interruption of the electrical low-voltage circuit by the semiconductor-based switching elements, which are put into the high-impedance state, if at least two successive said difference voltage values have been exceeded.

17. The method according to claim 15, which further comprises initiating the interruption of the electrical low-voltage circuit by the semiconductor-based switching elements, which are put into the high-impedance state, if at least two successive said current change values have been exceeded.

18. The method according to claim 15, wherein the semiconductor-based switching elements have a low-impedance state for a purpose of current flow in the electrical low-voltage circuit.

19. The method according to claim 15, which further comprises initiating electrical isolation if an electronic interruption unit is at high impedance and the current in the electrical low-voltage circuit exceeds a third threshold value.

* * * * *